United States Patent
Anscher

[19]

[11] Patent Number: 5,947,629
[45] Date of Patent: Sep. 7, 1999

[54] CORD FASTENER

[75] Inventor: Joseph Anscher, Muttontown, N.Y.

[73] Assignee: National Molding Corporation, Farmingdale, N.Y.

[21] Appl. No.: 08/907,135

[22] Filed: Aug. 6, 1997

[51] Int. Cl.⁶ .................................................. F16B 2/18
[52] U.S. Cl. .................................. 403/374.5; 403/322.4; 24/132 R
[58] Field of Search .............................. 24/265 H, 129 R, 24/132 R, 134 R; 403/314, 315, 316, 319, 320, 373, 322.4, 374.1, 374.2, 374.5

[56] References Cited

U.S. PATENT DOCUMENTS

| | | | |
|---|---|---|---|
| 845,035 | 2/1907 | Strasbaugh | 24/134 R X |
| 3,110,070 | 11/1963 | Tremblay | 24/134 R |
| 4,235,412 | 11/1980 | Rath et al. | 24/132 R X |
| 4,300,269 | 11/1981 | Boden | 24/134 R |
| 4,424,609 | 1/1984 | Boden | 24/134 R |
| 4,461,059 | 7/1984 | Bury | 24/129 R |
| 4,878,270 | 11/1989 | Westerkamp | 24/134 R X |
| 4,912,817 | 4/1990 | Sandreid | 24/132 R |
| 4,998,327 | 3/1991 | Hull et al. | 24/134 R |
| 5,136,756 | 8/1992 | Krauss | 24/265 H |

FOREIGN PATENT DOCUMENTS

| | | | |
|---|---|---|---|
| 464191 | 10/1973 | Australia | 24/134 R |
| 800217 | 12/1968 | Canada | 24/134 R |

Primary Examiner—Harry C. Kim
Attorney, Agent, or Firm—Kenyon & Kenyon

[57] ABSTRACT

A fastener for releasably clamping cords which includes a housing having a bore therein and a movable locking arm selectively movable from an unlocked to a locked position. The housing and the locking arm are provided with securing protrusions for securing a cord disposed in the bore and are arranged so that as the cord is pulled away from the housing the locking arm is urged or biased into the locked position.

43 Claims, 5 Drawing Sheets

CORD FASTENER

FIELD OF INVENTION

The present invention relates generally to a device for selectively securing a cord, rope, or other elongated flexible article and more particularly to a device for selectively securing and attaching a bungie cord.

BACKGROUND OF THE INVENTION

Various clamps are known in the prior art. For instance, U.S. Pat. No. 4,368,999 discloses a coupling for connecting the end part of a flexible element such as a cable or wire. The part is formed from two separate portions. The first portion is a cage receiving the flexible element and includes laterally at least one extending flexible strip normally projecting outside of the cage. A second portion is a slider being adapted to be slid over the cage in order to urge the strip inwardly so that a portion of the strip is embedded in the flexible element.

U.S. Pat. No. 5,283,930 discloses a clasp for a folded cord includes two portions which make to form a clasp body thereby capturing the folded cord therebetween. The portions include gripping teeth for defining a tortious path for the cord.

One shortcoming of these prior art securing devices is that they are complicated and, thus, expensive to manufacture.

Another shortcoming of these prior art devices is that it may be difficult or time consuming to introduce and remove the cord or rope from the securing device.

Yet another shortcoming of prior art devices is that the portions securing the cord or rope may tend to open or loosen in response to the cord or rope being pulled in a direction away from the housing.

SUMMARY OF THE INVENTION

It is an object of this invention to provide an apparatus for easily and quickly securing a rope or cord that is simple and inexpensive to manufacture.

It is another object of this invention to provide an apparatus for securing a rope or cord which is provided with a means for fastening the cord to another object.

It is another object of this invention to provide an apparatus for securing a rope or cord that urges the locking portions into a locking position in response to a pull or tug or other tension applied to the rope or cord.

It is an object of this invention to provide a device for selectively securing an elongated flexible article, comprising a housing having a first end, a second end, an outer wall, and an inner wall defining a blind longitudinal bore sized to receive said elongated flexible article; a locking arm rotatably mounted on said housing, said locking arm provided with at least one locking arm engagement protrusion, said locking arm rotatably movable from an unlocked first position which provides a first clearance between said inner wall and said at least one locking arm engagement protrusion, said first clearance sufficient for said elongated flexible article to be introduced into and withdrawn from said longitudinal bore, said locking arm rotatable to a locked second position providing a second clearance between said inner wall and said at least one locking arm engagement protrusion, said second clearance smaller than said first clearance and sized so that when said locking arm is in said second position said inner wall, and said at least one locking arm engagement protrusion impinge on said flexible article in an amount sufficient to secure said flexible article in said longitudinal bore, said inner wall, and said at least one locking arm engagement protrusion sized and disposed so that when said elongated flexible article is pulled in a direction away from said housing, said rotatable arm is urged toward said second position; means for selectively moving said locking arm from said first position to said second position; and means for locking said locking arm in said second position.

It is another object of this invention to provide a device for selectively securing an elongated flexible article, comprising a housing having a first end, a second end, an outer wall, and an inner wall defining a blind longitudinal bore sized to receive said elongated flexible article, said inner wall provided with an engagement protrusion; a locking arm rotatably mounted on said housing, said locking arm provided with at least one flexible tooth-like member, said locking arm rotatably movable from an unlocked first position which provides a first clearance between said inner wall engagement protrusion and said at least one tooth-like member, said first clearance sufficient for said elongated flexible article to be introduced into and withdrawn from said longitudinal bore, said locking arm rotatable to a locked second position providing a second clearance between said inner wall engagement protrusion and said at least one flexible tooth-like member, said member sized and adapted to accommodate and to secure cords of varying diameters when said locking arm is disposed in said second or locked position, said second clearance smaller than said first clearance and sized so that when said locking arm is in said second position, said inner wall engagement protrusion and said at least one tooth-like member impinge on said flexible article in an amount sufficient to secure said flexible article in said longitudinal bore, said inner wall engagement protrusion and said at least one tooth-like member sized and disposed so that when said elongated flexible article is pulled in a direction away from said housing, said rotatable arm is urged toward said second position; means for selectively moving said locking arm from said first position to said second position; and means for locking said locking arm in said second position.

It is another object of this invention to provide a device for selectively securing an elongated flexible article, comprising: a housing having a first end, a second end, an outer wall, and an inner wall defining a blind longitudinal bore sized to receive said elongated flexible article, said inner wall provided with an engagement protrusion; a locking arm rotatably mounted on said housing, said locking arm provided with a first locking arm engagement protrusion and a second locking arm engagement protrusion, said locking arm rotatably movable from an unlocked first position which provides a first clearance between said inner wall engagement protrusion and said first locking arm engagement protrusion, and said second locking arm engagement protrusion, said first clearance sufficient for said elongated flexible article to be introduced into and withdrawn from said longitudinal bore, said locking arm rotatable to a locked second position providing a second clearance between said inner wall engagement protrusion and said first locking arm engagement protrusion and said second locking arm engagement protrusion, said second clearance smaller than said first clearance and sized so that when said locking arm is in said second position said inner wall engagement protrusion, said first locking arm engagement protrusion, and said second locking arm engagement protrusion impinge on said flexible article in an amount sufficient to secure said flexible article in said longitudinal bore, said inner wall engagement protrusion, said first locking arm engagement protrusion, and said second locking arm engagement protrusion sized and disposed so that when said elongated flexible article is pulled in a direction away from said housing, said rotatable arm is said second position; and means for selectively moving said locking arm from said first position to said second position; and means for locking said locking arm in said second position.

It is another object of this invention to provide a bungie hook for selectively securing a bungie cord to an article, comprising: a bungie hook for selectively securing a bungie cord to an article, comprising: a housing having a first end, a second end, an outer wall, and an inner wall defining a blind longitudinal bore sized to receive said bungie cord, said inner wall provided with an engagement protrusion; a locking arm rotatably mounted on said housing, said locking arm provided with a first locking arm engagement protrusion and a second locking arm engagement protrusion, said locking arm rotatably movable from an unlocked first position which provides a first clearance between said inner wall engagement protrusion and said first locking arm engagement protrusion and said second locking arm engagement protrusion, said first clearance sufficient for said bungie cord to be introduced into and withdrawn from said longitudinal bore, said locking arm rotatably movable to a locked second position providing a second clearance between said inner wall engagement protrusion and said first locking arm engagement protrusion and said second locking arm engagement protrusion, said second clearance smaller than said first clearance and sized so that when said locking arm is in said second position said inner wall engagement protrusion, said first locking arm engagement protrusion, and said second locking arm engagement protrusion impinge on said bungie cord in an amount sufficient to secure said bungie cord in said longitudinal bore, said inner wall engagement protrusion, said first locking arm engagement protrusion, and said second locking arm engagement protrusion sized and disposed so that when said bungie cord is pulled in a direction away from said housing, said rotatable arm is urged toward said second position; means for selectively moving said locking arm from said first position to said second position; means for locking said locking arm in said second position; and an attaching means disposed at said first end of said housing for attaching said bungie hook to an object.

DETAILED DESCRIPTION OF THE PREFERRED EMBODIMENTS

Figures 1, 2:
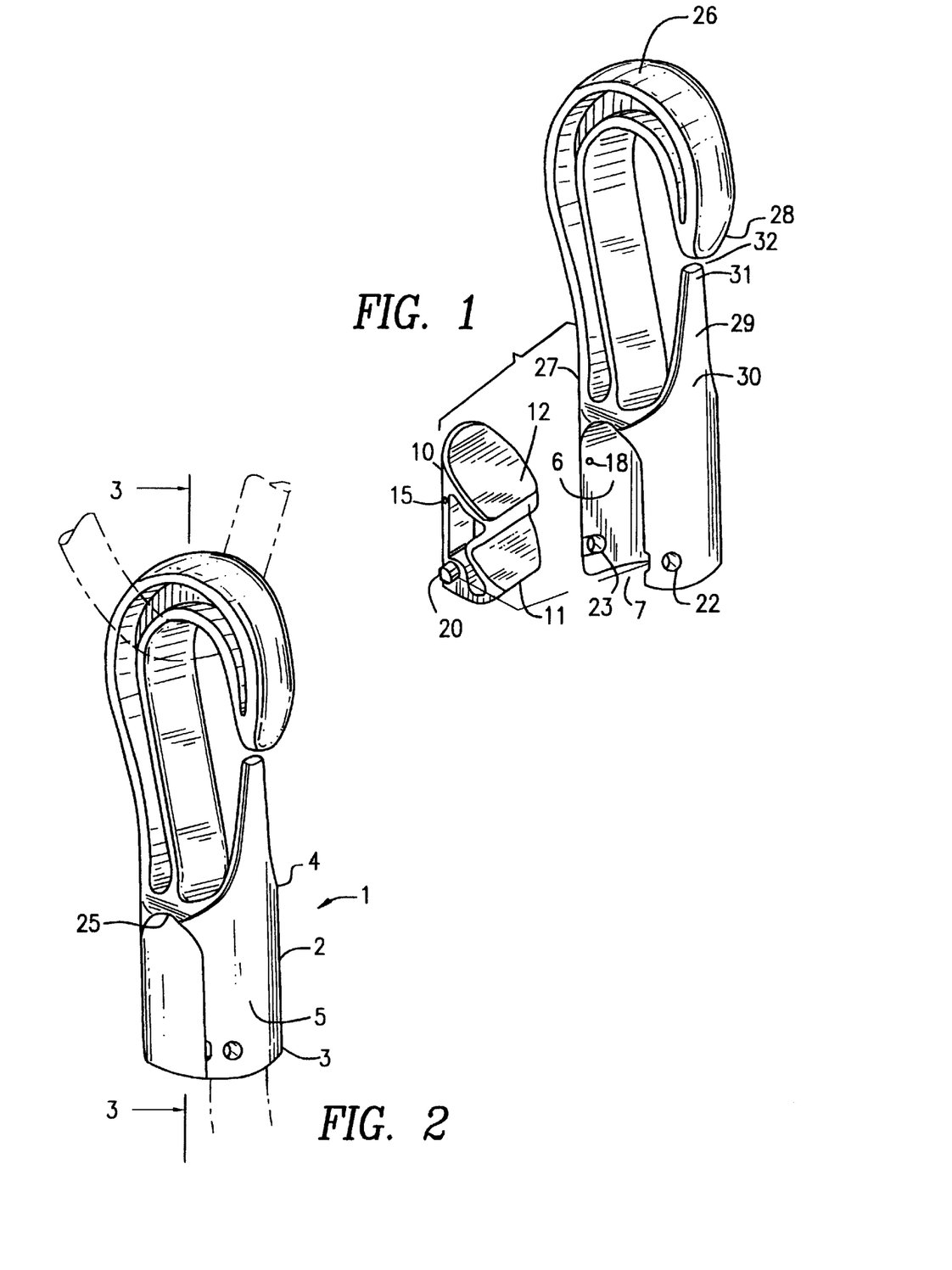
FIG. 1 shows a locking arm and housing constructed in accordance with the invention.
FIG. 2 is the device of FIG. 1 with the locking arm disposed in the second position.

FIG. 1 shows a cord fastener 1 constructed in accordance with the present invention and shows a housing 2 having a first end 3, a second end 4, an outer wall 5, and an inner wall 6 defining a blind longitudinal bore 7. The bore 7 is sized to receive an elongated flexible article such as a cord, cable, or rope 8 (shown in phantom in FIGS. 2 and 3). The inner wall 6 may be provided with an engagement protrusion 9 (shown in FIGS. 3 and 4.) A plurality of engagement protrusions may be utilized as specific applications dictate.

Figure 3:
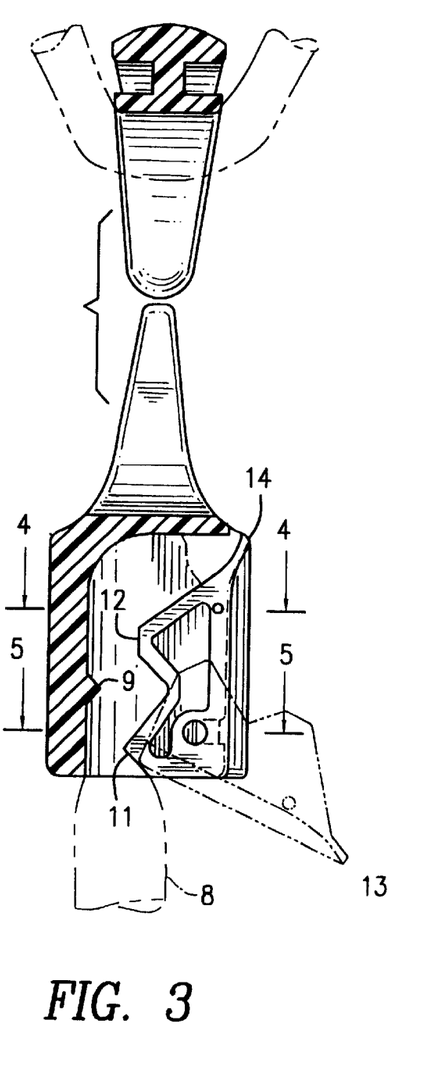
FIG. 3 is a cross-sectional side view of the device shown in FIG. 2.
Figure 3A:
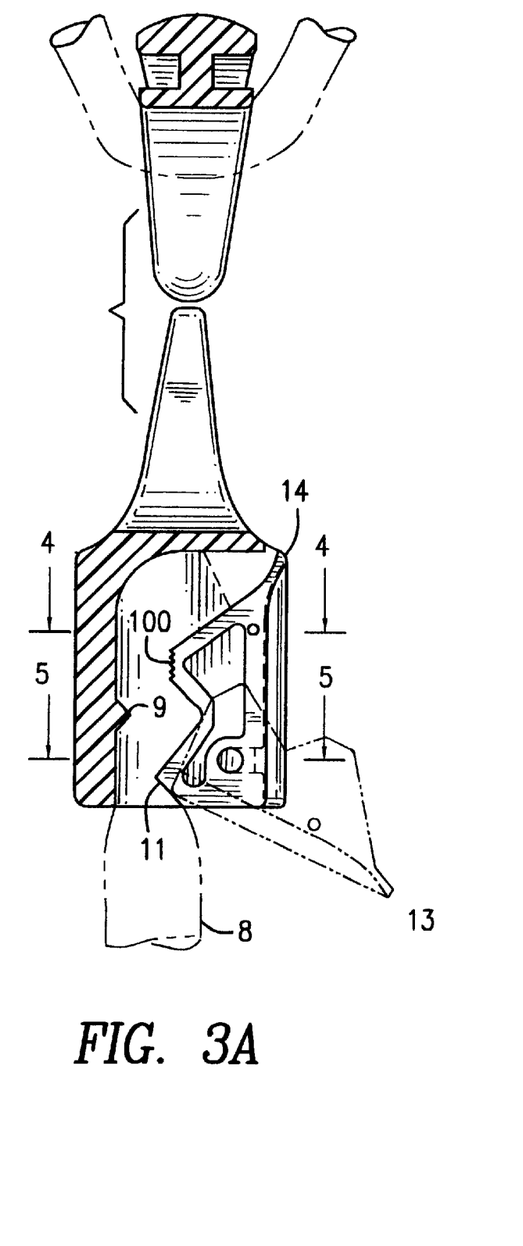
FIG. 3A shows an alternative embodiment of the invention in which the locking arm is provided with serrations.
Figure 3B:
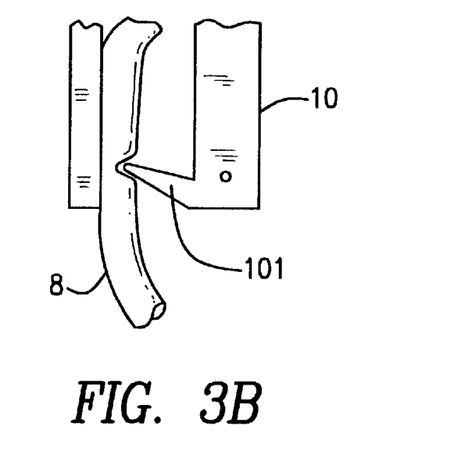
FIG. 3B shows an alternative embodiment of the invention utilizing a flexible tooth-like member.
Figure 3C:
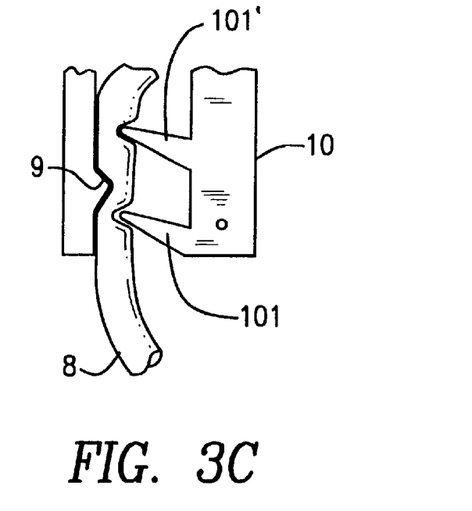
FIG. 3C shows a preferred alternative embodiment of the invention.
Figure 4:
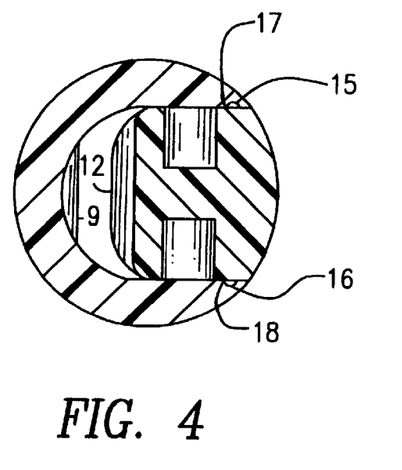
FIG. 4 is a cross-sectional top view taken along line 4—4 of FIG. 3.
Figure 5:
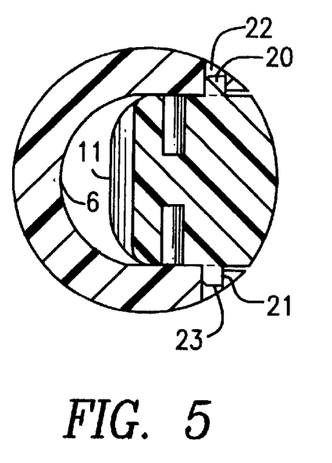
FIG. 5 is a cross-sectional top view taken along line 5—5 of FIG. 3.

A locking arm 10 is rotatably mounted on the housing 2 and may be provided with one or more locking arm engagement protrusions. In the embodiment shown, the locking arm is provided with a first locking arm engagement protrusion 11 and a second locking arm engagement protrusion 12. More than two protrusions 11 and 12 may be utilized as specific applications dictate. In an especially preferred embodiment, the engagement protrusions are provided with serrations 100 as shown in FIG. 3A. The engagement protrusions 11 and 12 may be substantially rigid. In an alternative embodiment, the locking arm is provided with one or more flexible tooth-like members 101 (shown in FIGS. 3B and 3C). The flexible tooth-like members 101 and 101' are sized and adapted to flex so as to accommodate and secure cords of different diameters in longitudinal bore 7. In an especially preferred embodiment, shown in FIG. 3C, the housing is provided with an engagement protrusion 9 and the locking arm is provided with two flexible tooth-like members 101 and 101'. The engagement protrusion 9 may also be provided with serrations 100. The locking arm 10 is rotatably movable from an unlocked first position 13 to a locked second position 14 as shown in FIG. 3. Means are provided for selectively rotatably moving the locking arm from the first or unlocked position 13 to the second or locked position 14. In one preferred embodiment, as shown in FIGS. 1, 2, 3, and 5, the means for moving the locking arm 10 from the first position 13 to the second position 14 comprises a pair of cylindrical protrusions 20 and 21 extending from the locking arm 10 for close fitting engagement with a similarly shaped corresponding pair of depressions 22 and 23 disposed in the housing 2. The outward ends of protrusions may be cammed, as shown in FIGS. 1 and 5, to facilitate a "snap-fit" engagement of protrusions 20 and 21 with depressions 22 and 23 and, thus, facilitate assembly.

When the locking arm 10 is disposed in the first position 13 it provides a first clearance C1 between the inner wall engagement protrusion 9 and the first locking arm engagement protrusion 11 and the second locking arm engagement protrusion 12. This first clearance C1 is sufficient to permit a cord, rope, wire or other elongated flexible article 8 to be introduced into and withdrawn from the longitudinal bore 7. When the locking arm 10 is rotated and moved to the second locking position 14 it provides a second clearance C2 between the inner wall engagement protrusion 9, the first locking arm engagement protrusion 11, and the second locking arm engagement protrusion 12. The second clearance C2 is smaller than the first clearance C1 which causes the inner wall engagement protrusion 9, the first locking arm engagement protrusion 11 and the second locking arm engagement protrusion 12 to impinge upon a cord, rope or wire 8 disposed in the longitudinal bore 7 in an amount sufficient to secure the cord, rope or wire 8 in the longitudinal bore 7 of the housing 2. The inner wall engagement protrusion 9, the first locking arm engagement protrusion 11, and the second locking arm engagement protrusion 12 are sized and disposed in a cooperative arrangement so that when the rope, cord or wire 8 is pulled or tugged in a direction away from the housing 2, the pressure applied to the first locking arm engagement protrusion 11 causes the locking arm 10 to be urged toward the second or locked position 14. Thus, the harder the cord or wire 8 is pulled, the tighter it is secured within the bore 7 of the housing 2.

Figure 7:
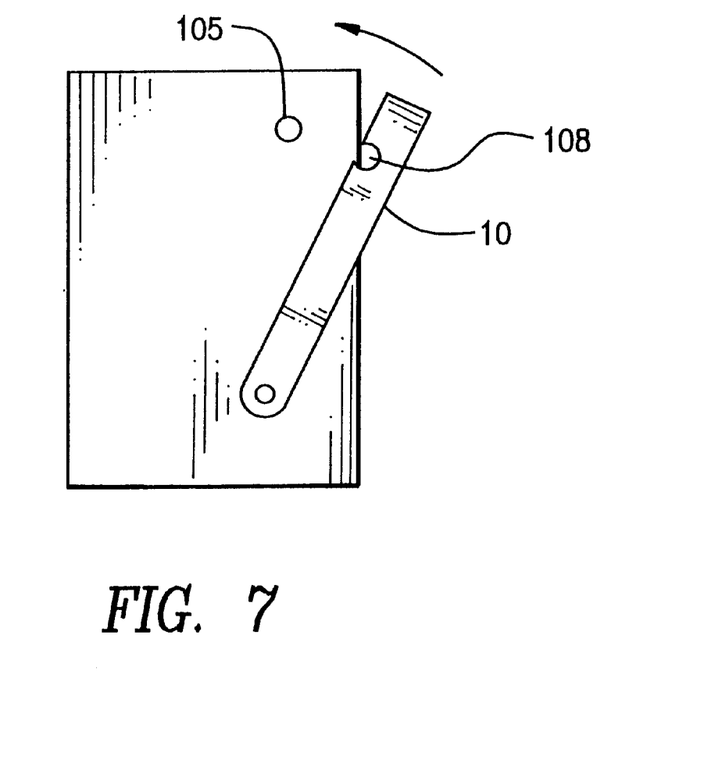
FIGS. 7 and 7A show an alternative embodiment of a locking means utilized in accordance with the invention.
Figure 7A:
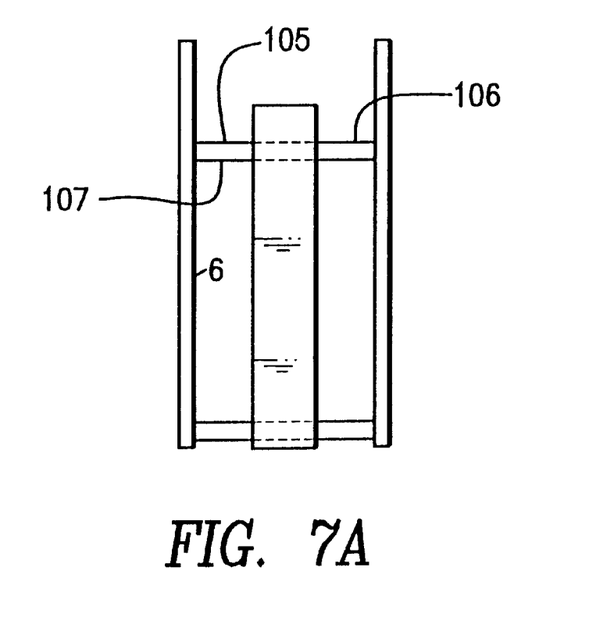

In a preferred embodiment, the device is provided with a locking means for selectively locking the locking arm 10 in the second or locked position 14. A variety of locking means well known to those skilled in the art as suitable for this purpose may be utilized, however, in a preferred embodiment a male female interlock is used. In one preferred embodiment, shown in FIGS. 1, 3, and 4, the locking arm 10 is provided with a pair of cylindrical protrusions 15 and 16 for close fitting engagement with a similarly shaped corresponding pair of depressions 17 and 18 disposed on the housing 2. In another embodiment, shown in FIGS. 7 and 7A, the locking means comprises a member 105 having a first end 106 and a second end 107 with each end attached to the inner wall 6 of the housing. A channel 108 is disposed in the locking arm 10. The channel 108 and the locking arm 10 are sized and disposed so that when the locking arm is moved to the second or locking position 14 the channel 108 engages the member 105. In an especially preferred embodiment, the locking arm is provided with a fingernail tab 25 for grasping the locking arm 10 or 24 and, thus, facilitating the selective movement of the locking arm 10 or 24 from the second or locked position 14 to the first or unlocked position 13.

Figure 6A:
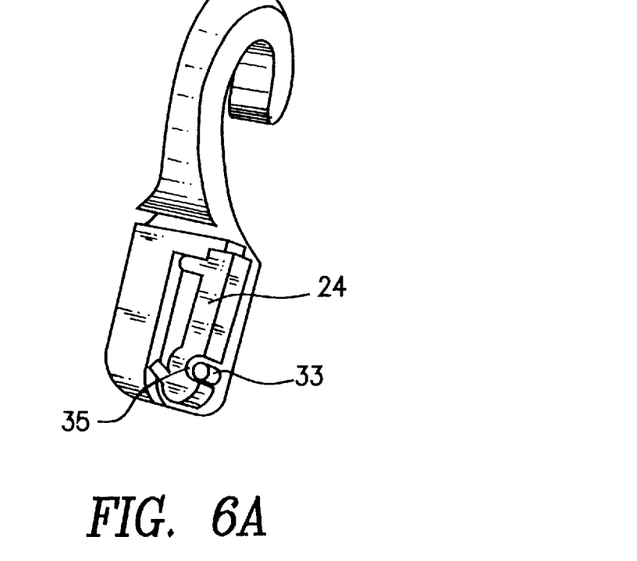
FIGS. 6A and 6B show an alternative embodiment of a locking arm and housing constructed in accordance with the invention.
Figure 6B:
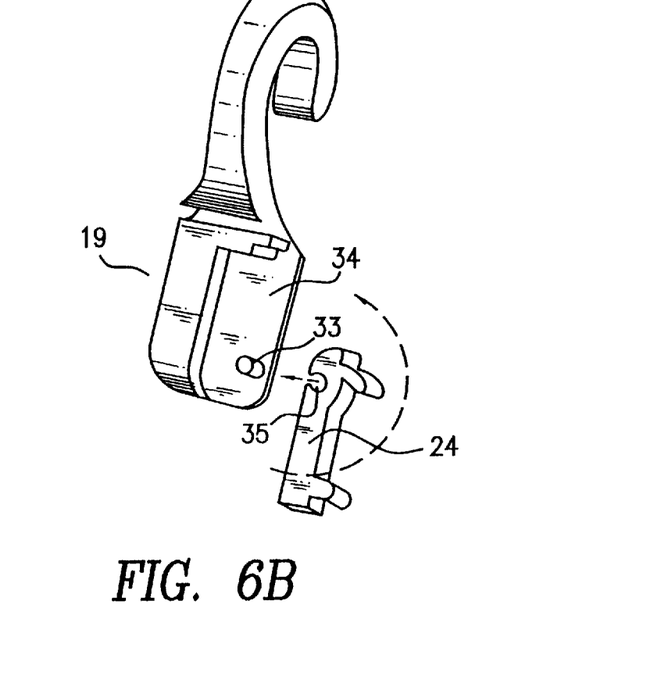

Another preferred embodiment is shown in FIGS. 6A, 6B, and 6C (a portion of the housing is omitted for clarity). In this embodiment, the means for moving the locking arm 24 from the first or unlocked position to the second or locked position comprises a cylindrical shaped protrusion 33 having a first end and a second end extending from the inner wall 34 of the housing 19 for close fitting engagement with a similarly shaped corresponding bore 35 disposed in the locking arm 24. As shown in FIG. 6C, the first and second ends of the protrusion are attached to the inner wall surface. In an especially preferred embodiment shown in FIGS. 6A and 6B, the bore 35 and protrusion 33 are appropriately sized and a portion of the locking arm 24 is removed so as to permit a "snap-fit" assembly. A locking means as previously discussed may also be provided in this embodiment. The locking means for the cord may also comprise a flexible locking arm protrusion mounted on the locking arm. The flexible locking arm is selected from a material and is sized and adapted so that when disposed in a locked position it will accommodate and impinge upon cords of varying diameters and secure the cord against the inner wall of the base.

A variety of attachment means well known to those skilled in the art as suitable for this purpose may be utilized and may be disposed on the second end 4 of the housing 2 for attaching the cord or rope 8 secured in the housing 2 to a device, however, as shown in FIGS. 1, 2, 3, and 6A and 6B in a preferred embodiment, a hook 26 is utilized.

As shown in FIGS. 1 and 2, the hook 26 has a first end 27 and a second end 28 with the first end 27 of the hook attached to the second end 4 of the housing 2. In an especially preferred embodiment, a fastening guard 29 is also provided to selectively engage and disengage the hook 26 from a device. A variety of fastening guards well known to those skilled in the art as suitable for this purpose may be used, however, in a preferred embodiment, a selectively flexible longitudinal member 29 is utilized.

As shown in FIGS. 1, 2, and 3, the selectively flexible longitudinal fastening guard 29 has a first end 30 and a second end 31. The first end 30 of the selectively flexible longitudinal fastening guard 29 is attached to the second end 4 of the housing 2 and the second end 31 of the fastening guard 29 is disposed a variable distance from the second end 28 of the hook 26 so as to leave a variable gap 32 between the second end 31 of the longitudinal fastening guard 29 and the second end 28 of the hook 26. When pressure is selectively applied the longitudinal fastening guard 29 it is selectively flexed, the second end 31 of the fastening guard 29 is displaced away from the second end 28 of the hook 26 and the gap 32 enlarges in an amount sufficient so as to permit the hook 26 to be attached to or removed from a device. When pressure is removed from the selectively flexible longitudinal fastening guard 29, the second end 31 of the guard 29 is displaced in a direction toward the second end 28 of the hook 26 towards its original position and the gap 32 returns to its original securing size.

Although the present invention has been described in specific and detailed terms with respect to the preferred embodiments as set forth above, various other embodiments of this invention including alterations in size, shape, etc., substitutions of conventional elements and other applications will be readily apparent to those with ordinary skill in the art without departing from the broader spirit and scope of the invention as set forth in the appended claims. Therefore, the specification is to be regarded in an illustrative rather than restrictive sense.

What is claimed is:

1. A device for selectively securing an elongated flexible article, comprising:

a) a housing having a first end, a second end, an outer wall, and an inner wall defining a blind longitudinal bore sized to receive said elongated flexible article, said inner wall provided with an engagement protrusion;

b) a locking arm rotatably mounted on said housing, said locking arm provided with a first flexible locking arm engagement protrusion and a second flexible locking arm engagement protrusion, said locking arm rotatably movable from an unlocked first position which provides a first clearance between said inner wall engagement protrusion and said first flexible locking arm engagement protrusion, and said second flexible locking arm engagement protrusion, said first clearance sufficient for said elongated flexible article to be introduced into and withdrawn from said longitudinal bore, said locking arm rotatable to a locked second position providing a second clearance between said inner wall engagement protrusion and said first flexible locking arm engagement protrusion and said second flexible locking arm engagement protrusion, said second clearance smaller than said first clearance and sized so that when said locking arm is in said second position said inner wall engagement protrusion, said first flexible locking arm engagement protrusion, and said flexible second locking arm engagement protrusion impinge on said flexible article in an amount sufficient to secure said flexible article in said longitudinal bore, said inner wall engagement protrusion, said first flexible locking arm engagement protrusion, and said second flexible locking arm engagement protrusion sized and disposed so that when said elongated flexible article is pulled in a direction away from said housing, said rotatable arm is urged toward said second position, said first flexible locking arm engagement protrusion and said second flexible locking arm engagement protrusion sized and adapted to flex so as to accommodate and secure cords of varying diameters when said locking arm is disposed in said second or locked position;

c) means for selectively moving said locking arm from said first position to said second position; and d) means for locking said locking arm in said second position.

2. The device of claim 1, wherein said means for selectively moving comprises a plurality of protrusions extending from said locking arm sized and adapted to selectively engage corresponding apertures disposed in said housing.

3. The device of claim 1, wherein said locking means comprises a plurality of protrusions extending from said locking arm sized and adapted to selectively engage corresponding apertures disposed in said housing.

4. The device of claim 1, wherein said locking means comprises a plurality of protrusions extending from said housing sized and adapted to selectively engage corresponding apertures disposed in said locking arm.

5. The device of claim 1, wherein said locking means comprises a channel disposed in said locking arm and a member having a first end and a second end, said first and second ends attached to said inner wall of said housing, said channel sized and adapted to engage said member when said locking arm is disposed in said second locked position.

6. A bungie hook for selectively securing a bungie cord to an article, comprising:

a) a housing having a first end, a second end, an outer wall, and an inner wall defining a blind longitudinal bore sized to receive said bungie cord, said inner wall provided with an engagement protrusion;

b) a locking arm rotatably mounted on said housing, said locking arm provided with a first flexible locking arm engagement protrusion and a second flexible locking arm engagement protrusion, said locking arm rotatably movable from an unlocked first position which provides a first clearance between said inner wall engagement protrusion and said first flexible locking arm engagement protrusion and said second flexible locking arm engagement protrusion, said first clearance sufficient for said bungie cord to be introduced into and withdrawn from said longitudinal bore, said locking arm rotatably movable to a locked second position providing a second clearance between said inner wall engagement protrusion and said first flexible locking arm engagement protrusion and said second flexible locking arm engagement protrusion, said second clearance smaller than said first clearance and sized so that when said locking arm is in said second position said inner wall engagement protrusion, said first flexible locking arm engagement protrusion, and said second flexible locking arm engagement protrusion impinge on said bungie cord in an amount sufficient to secure said bungie cord in said longitudinal bore, said inner wall engagement protrusion, said first flexible locking arm engagement protrusion, and said second flexible locking arm engagement protrusion sized and disposed so that when said bungie cord is pulled in a direction away from said housing, said rotatable arm is urged toward said second position, said first flexible locking arm engagement protrusion and said second flexible locking arm engagement protrusion sized and adapted to flex so as to accommodate and secure cords of varying diameters when said locking arm is disposed in said second or locked position;

c) means for selectively moving said locking arm from said first position to said second position;

d) means for locking said locking arm in said second position; and e) an attaching means disposed at said first end of said housing for attaching said bungie hook to an object.

7. The bungie hook of claim 6, wherein said means for selectively moving comprises a plurality of protrusions extending from said locking arm sized and adapted to selectively engage corresponding apertures disposed in said housing.

8. The bungie hook of claim 6, wherein said attaching means comprises a hook projecting from said first end of said housing, said hook comprising a first end and a second end, said second end of said hook attached to said housing.

9. The bungie hook of claim 8, further comprising a fastening guard disposed at said first end of said housing for the selective engagement and disengagement of said hook from an object.

10. The bungie hook of claim 9, wherein said fastening guard comprises a selectively flexible longitudinal member having a first and a second end, said first end attached to said second end of said housing, said second end of said longitudinal member disposed a variable distance from said second end of said hook to permit selective engagement and disengagement of said hook to an object.

11. The bungie hook of claim 10, wherein said locking means comprises a plurality of protrusions extending from said locking arm sized and adapted to selectively engage corresponding apertures disposed in said housing.

12. The bungie hook of claim 10, wherein said locking means comprises a plurality of protrusions extending from said housing sized and adapted to selectively engage corresponding apertures disposed in said locking arm.

13. The bungie hook of claim 10, wherein said locking means comprises a channel disposed in said locking arm and a member having a first end and a second end, said first and second ends attached to said inner wall of said housing, said channel sized and adapted to engage said member when said locking arm is disposed in said second locked position.

14. A device for selectively securing an elongated flexible article, comprising:

a) a housing having a first end, a second end, an outer wall, and an inner wall defining a blind longitudinal bore sized to receive said elongated flexible article;

b) a locking arm rotatably mounted on said housing, said locking arm provided with a first flexible locking arm engagement protrusion and a second flexible locking arm engagement protrusion, said locking arm rotatably movable from an unlocked first position which provides a first clearance between said inner wall and said first flexible locking arm engagement protrusion and said second flexible locking arm engagement protrusion, said first clearance sufficient for said elongated flexible article to be introduced into and withdrawn from said longitudinal bore, said locking arm rotatable to a locked second position providing a second clearance between said inner wall and said first flexible locking arm engagement protrusion and said second flexible locking arm engagement protrusion, said second clearance smaller than said first clearance and sized so that when said locking arm is in said second position said inner wall, said first flexible locking arm engagement protrusion and said second flexible locking arm engagement protrusion impinge on said flexible article in an amount sufficient to secure said flexible article in said longitudinal bore, said inner wall said first flexible locking arm engagement protrusion, and said second flexible locking arm engagement protrusion sized and disposed so that when said elongated flexible article is pulled in a direction away from said housing, said rotatable arm is urged toward said second position, said first flexible locking arm engagement protrusion and said second flexible locking arm engagement protrusion sized and adapted to flex so as to accommodate and secure cords of varying diameters when said locking arm is disposed in said second or locked position.

15. The device of claim 14, wherein said means for selectively moving comprises a protrusion extending from said inner wall sized and adapted to selectively engage a corresponding aperture disposed in said locking arm.

16. The device of claim 14, further comprising an inner wall engagement protrusion disposed on said inner wall.

17. The device of claim 14, further comprising a means for locking said locking arm in said second position.

18. The device of claim 17, wherein said means for locking comprises a plurality of protrusions extending from said locking arm sized and adapted to selectively engage corresponding apertures disposed in said housing.

19. The device of claim 17, wherein said means for locking comprises a plurality of protrusions extending from said housing sized and adapted to selectively engage corresponding apertures disposed in said locking arm.

20. The device of claim 17, wherein said locking means comprises a channel disposed in said locking arm and a member having a first end and a second end, said first and second ends attached to said inner wall of said housing, said channel sized and adapted to engage said member when said locking arm is disposed in said second locked position.

21. A device for selectively securing an elongated flexible article, comprising:
 a) a housing having a first end, a second end, an outer wall, and an inner wall defining a blind longitudinal bore sized to receive said elongated flexible article;
 b) a locking arm rotatably mounted on said housing, said locking arm provided with at least one flexible locking arm engagement protrusion, said locking arm rotatably movable from an unlocked first position which provides a first clearance between said inner wall and said at least one locking arm engagement protrusion, said first clearance sufficient for said elongated flexible article to be introduced into and withdrawn from said longitudinal bore, said locking arm rotatable to a locked second position providing a second clearance between said inner wall and said at least one flexible locking arm engagement protrusion, said second clearance smaller than said first clearance and sized so that when said locking arm is in said second position said inner wall, and said at least one flexible locking arm engagement protrusion impinge on said flexible article in an amount sufficient to secure said flexible article in said longitudinal bore, said inner wall, and said at least one flexible locking arm engagement protrusion sized and disposed so that when said elongated flexible article is pulled in a direction away from said housing, said rotatable arm is urged toward said second position; said at least one flexible locking arm engagement protrusion sized and adapted to flex so as to accommodate and secure cords of varying diameters when said locking arm is disposed in said second or locked position
 c) means for selectively moving said locking arm from said first position to said second position; and
 d) means for locking said locking arm in said second position.

22. The device of claim 21, wherein said means for selectively moving comprises a plurality of protrusions extending from said locking arm sized and adapted to selectively engage corresponding apertures disposed in said housing.

23. The device of claim 21, wherein said locking means comprises a plurality of protrusions extending from said locking arm sized and adapted to selectively engage corresponding apertures disposed in said housing.

24. The device of claim 21, wherein said locking means comprises a plurality of protrusions extending from said housing sized and adapted to selectively engage corresponding apertures disposed in said locking arm.

25. The device of claim 21, wherein said locking means comprises a channel disposed in said locking arm and a member having a first end and a second end, said first and second ends attached to said inner wall of said housing, said channel sized and adapted to engage said member when said locking arm is disposed in said second locked position.

26. A bungie hook for selectively securing a bungie cord to an article, comprising:
 a) a housing having a first end, a second end, an outer wall, and an inner wall defining a blind longitudinal bore sized to receive said bungie cord;
 b) a locking arm rotatably mounted on said housing, said locking arm provided with at least one flexible locking arm engagement protrusion, said locking arm rotatably movable from an unlocked first position which provides a first clearance between said inner wall and said at least one flexible locking arm engagement protrusion, said first clearance sufficient for said bungie cord to be introduced into and withdrawn from said longitudinal bore, said locking arm rotatably movable to a locked second position providing a second clearance between said inner wall and said at least one flexible locking arm engagement protrusion, said second clearance smaller than said first clearance and sized so that when said locking arm is in said second position said inner wall said and said at least one flexible locking arm engagement protrusion impinge on said bungie cord in an amount sufficient to secure said bungie cord in said longitudinal bore, said inner wall and said at least one flexible locking arm engagement protrusion sized and disposed so that when said bungie cord is pulled in a direction away from said housing, said rotatable arm is urged toward said second position; said at least one flexible locking arm engagement protrusion sized and adapted to flex so as to accommodate and secure cords of varying diameters when said locking arm is disposed in said second or locked position;
 c) means for selectively moving said locking arm from said first position to said second position;
 d) means for locking said locking arm in said second position; and
 e) an attaching means disposed at said first end of said housing for attaching said bungie hook to an object.

27. The bungie hook of claim 26, wherein said means for selectively moving comprises a plurality of protrusions extending from said locking arm sized and adapted to selectively engage corresponding apertures disposed in said housing.

28. The bungie hook of claim 26, wherein said attaching means comprises a hook projecting from said first end of said housing, said hook comprising a first end and a second end, said second end of said hook attached to said housing.

29. The bungie hook of claim 28, further comprising a fastening guard disposed at said first end of said housing for the selective engagement and disengagement of said hook from an object.

30. The bungie hook of claim 29, wherein said fastening guard comprises a selectively flexible longitudinal member having a first and a second end, said first end attached to said second end of said housing, said second end of said longitudinal member disposed a variable distance from said second end of said hook to permit selective engagement and disengagement of said hook to an object.

31. The bungie hook of claim 30, wherein said locking means comprises a plurality of protrusions extending from said locking arm sized and adapted to selectively engage corresponding apertures disposed in said housing.

32. The bungie hook of claim 30, wherein said locking means comprises a plurality of protrusions extending from said housing sized and adapted to selectively engage corresponding apertures disposed in said locking arm.

33. A device for selectively securing an elongated flexible article, comprising:
   a) a housing having a first end, a second end, an outer wall, and an inner wall defining a blind longitudinal bore sized to receive said elongated flexible article;
   b) a locking arm rotatably mounted on said housing, said locking arm provided with a first flexible locking arm engagement protrusion and a second flexible locking arm engagement protrusion, said locking arm rotatably movable from an unlocked first position which provides a first clearance between said inner wall and said first flexible locking arm engagement protrusion and said second flexible locking arm engagement protrusion, said first clearance sufficient for said elongated flexible article to be introduced into and withdrawn from said longitudinal bore, said locking arm rotatable to a locked second position providing a second clearance between said inner wall and said first flexible locking arm engagement protrusion and said second flexible locking arm engagement protrusion, said second clearance smaller than said first clearance and sized so that when said locking arm is in said second position said inner wall, said first flexible locking arm engagement protrusion and said second flexible locking arm engagement protrusion impinge on said flexible article in an amount sufficient to secure said flexible article in said longitudinal bore, said inner wall said first flexible locking arm engagement protrusion, and said second flexible locking arm engagement protrusion sized and disposed so that when said elongated flexible article is pulled in a direction away from said housing, said rotatable arm is urged toward said second position, said first flexible locking arm engagement protrusion and said second flexible locking arm engagement protrusion sized and adapted to flex so as to accommodate and secure cords of varying diameters when said locking arm is disposed in said second or locked position.

34. The device of claim 33, wherein said means for selectively moving comprises a protrusion extending from said inner wall sized and adapted to selectively engage a corresponding aperture disposed in said locking arm.

35. The device of claim 33, further comprising an inner wall engagement protrusion disposed on said inner wall.

36. The device of claim 33, further comprising a means for locking said locking arm in said second position.

37. The device of claim 36, wherein said means for locking comprises a plurality of protrusions extending from said locking arm sized and adapted to selectively engage corresponding apertures disposed in said housing.

38. The device of claim 36, wherein said means for locking comprises a plurality of protrusions extending from said housing sized and adapted to selectively engage corresponding apertures disposed in said locking arm.

39. The device of claim 36, wherein said locking means comprises a channel disposed in said locking arm and a member having a first end and a second end, said first and second ends attached to said inner wall of said housing, said channel sized and adapted to engage said member when said locking arm is disposed in said second locked position.

40. A device for selectively securing an elongated flexible article, comprising:
   a) a housing having a first end, a second end, an outer wall, and an inner wall defining a blind longitudinal bore sized to receive said elongated flexible article, said inner wall provided with an engagement protrusion;
   b) a locking arm rotatably mounted on said housing, said locking arm provided with at least one flexible tooth-like member, said locking arm rotatably movable from an unlocked first position which provides a first clearance between said inner wall engagement protrusion and said at least one flexible tooth-like member, said first clearance sufficient for said elongated flexible article to be introduced into and withdrawn from said longitudinal bore, said locking arm rotatable to a locked second position providing a second clearance between said inner wall engagement protrusion and said at least one flexible tooth-like member, said at least one flexible tooth-like member sized and adapted to flex so as to accommodate and to secure cords of varying diameters when said locking arm is disposed in said second or locked position, said second clearance smaller than said first clearance and sized so that when said locking arm is in said second position, said inner wall engagement protrusion and said at least one flexible tooth-like member impinge on said flexible article in an amount sufficient to secure said flexible article in said longitudinal bore, said inner wall engagement protrusion and said at least one tooth-like member sized and disposed so that when said elongated flexible article is pulled in a direction away from said housing, said rotatable arm is urged toward said second position;
   c) means for selectively moving said locking arm from said first position to said second position; and
   d) means for locking said locking arm in said second position.

41. The apparatus of claim 40 further comprising serrations disposed on said at least one flexible tooth-like member.

42. The apparatus of claims 1, 6, 14, or 33 further comprising serrations disposed on said locking arm engagement protrusions.

43. The apparatus of claims 21 or 26, further comprising serrations disposed on said at least one locking arm engagement protrusion.

* * * * *